Patented June 19, 1945

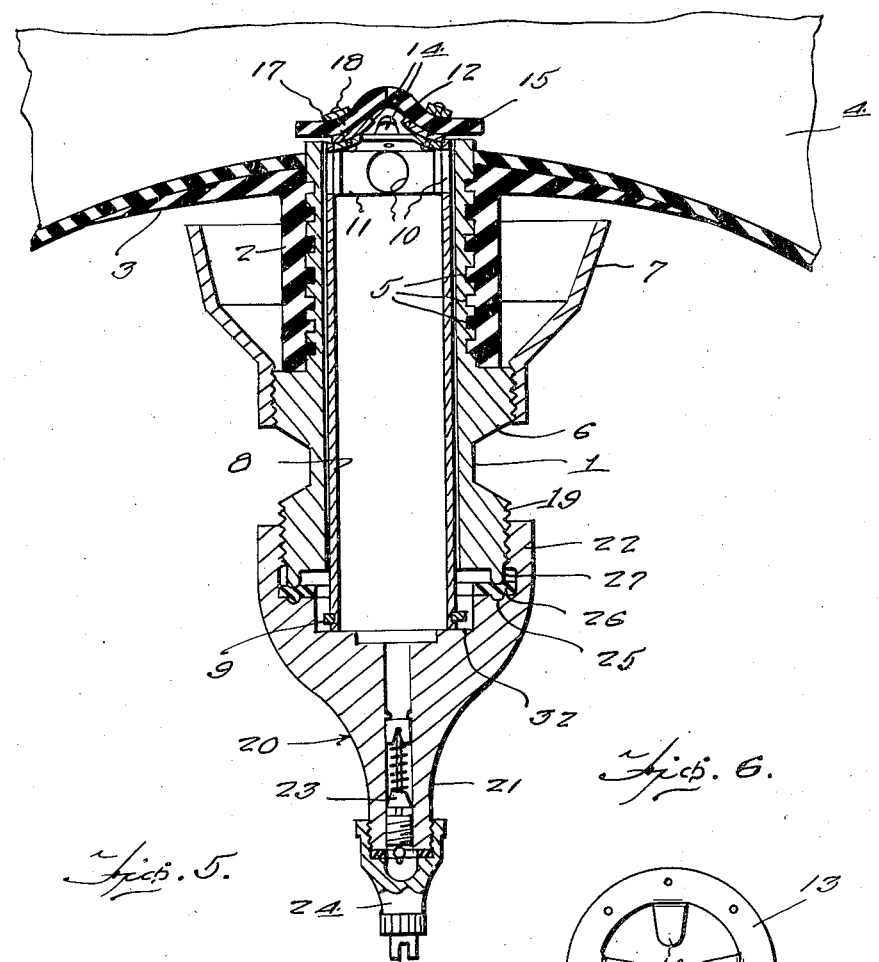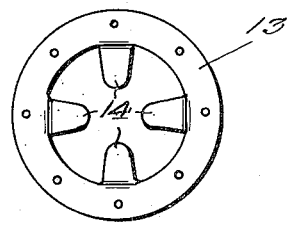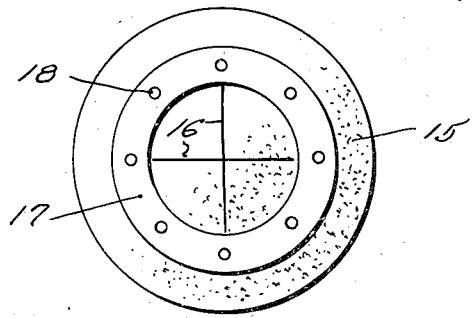

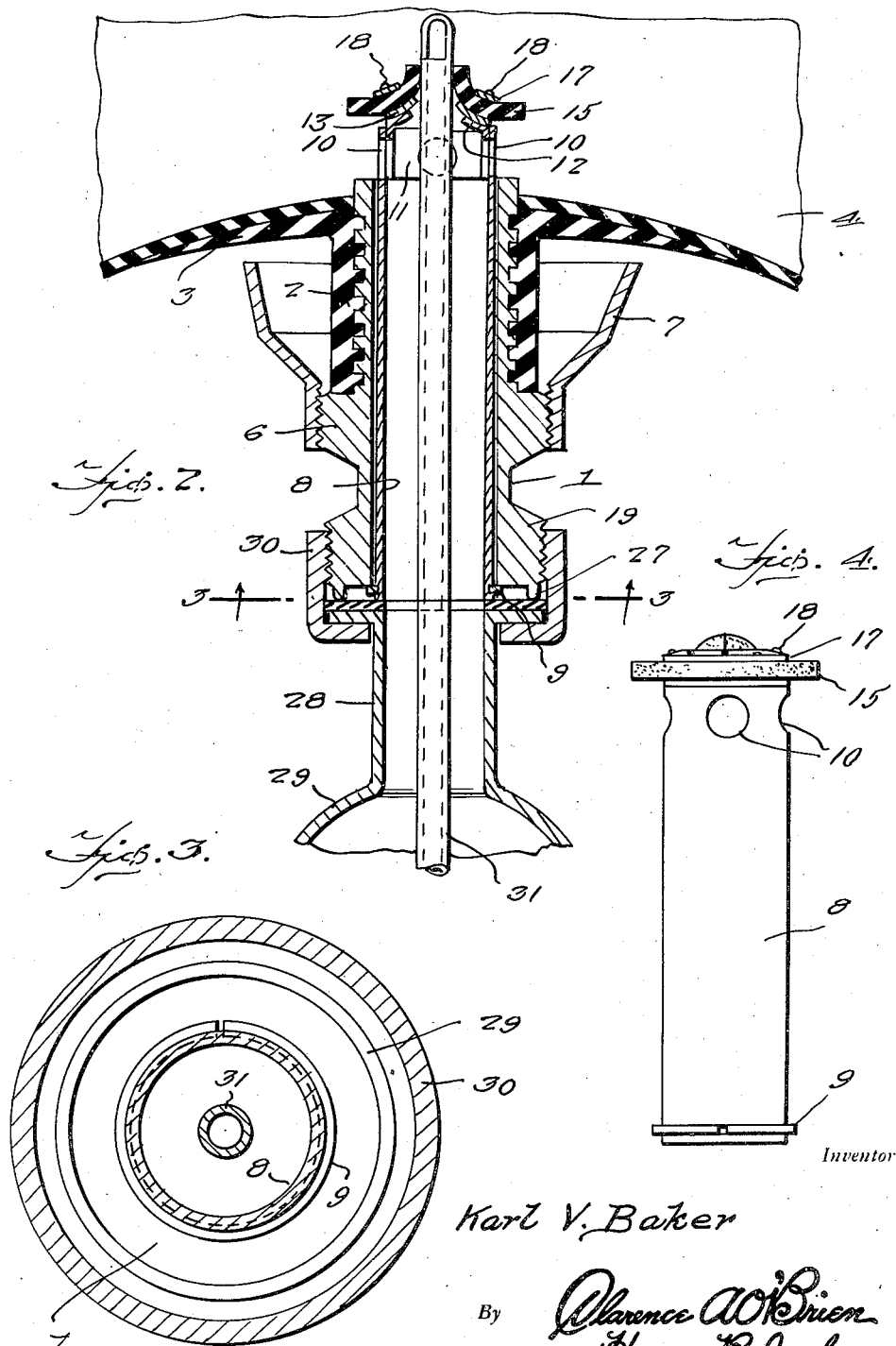

2,378,384

UNITED STATES PATENT OFFICE 2,378,384

TIRE VALVE

Karl V. Baker, Malaga, Ohio

Application January 2, 1943, Serial No. 471,159

3 Claims. (Cl. 152—415)

The present invention relates to new and useful improvements in tractor tire valves for use particularly in conjunction with an adapter.

The primary object of the invention is to provide, in a manner as hereinafter set forth, a valve of the aforementioned character comprising novel means for facilitating the inflating or filling of tractor tires with air, water or other fluids and for removing said fluids when desired.

Another very important object of the invention is to provide a valve of the character described embodying a construction and arrangement which is such that a tractor tire may be expeditiously inflated or deflated without loss of the fluid.

Other objects of the invention are to provide a tractor tire valve which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in vertical section through a valve constructed in accordance with the present invention.

Figure 2 is a vertical sectional view, showing the tire being filled with water.

Figure 3 is a view in horizontal section, taken substantially on the line 3—3 of Figure 2.

Figure 4 is a detail view in elevation of the slidable valve member.

Figure 5 is a top plan view of the slidable valve member.

Figure 6 is a detail view in plan of one of the elements of the slidable valve member.

Referring now to the drawings in detail, it will be seen that the embodiment of the invention which has been illustrated comprises a tubular stem 1 of suitable material. Molded on the upper or inner end portion of the stem 1 is a rubber connector 2 which is vulcanized at 3 to an inner tube 4 for mounting said stem thereon. Of course, the stem 1, which projects into the inner tube 4, communicates with said inner tube. The end portion of the stem 1 which carries the connector 2 is provided with circumferential grooves 5 for anchoring said connector in position. At an intermediate point, the stem 1 is further provided with a threaded flange 6. A bell or the like 7 is threaded on the flange 6 for engagement with the rim (not shown) of the tractor wheel for retaining the valve while the tire is being mounted.

Slidably mounted in the stem 1 is a tubular core 8. The tubular core 8 is adapted to project into the tube 4, in the manner shown to advantage in Figure 2 of the drawings. A split stop ring 9 is mounted on the outer end portion of the tubular core 8 for engagement with the corresponding end of the stem 1 for positively limiting sliding movement of said tubular core into the inner tube 4. The inner end portion of the tubular core 8 has formed therein a plurality of radical ports 10.

The tubular core 8 further includes, in its inner end portion, an internally flanged ring 11. The parts 10 extend through the ring 11. Mounted on the flange 12 of the ring 11 is a ring 13 having on its inner periphery a plurality of upwardly curved fingers 14. Mounted on the ring 13 is a flexible rubber sealing disk 15 having slits 16 therein, the purpose of which will be presently set forth. A retaining ring 17 is mounted on the sealing disk 15. Rivets 18 secure the elements 17, 15 and 13 in position on the flange 12.

The stem 1 further includes, on its outer end portion, a threaded enlargement or flange 19 which is slightly smaller in diameter than the flange 6 to permit the bell 7 to pass thereover. Removably mounted on the flange 19 is an inflation valve 20. The inflation valve 20 includes a stem 21 comprising an enlarged inner end portion 22 which is threaded on the flange 19. A valve core 23 is provided in the stem 21. Threaded on the outer end portion of the stem 21 is a cap 24.

The portion 22 of the stem 21 is provided with an internal, annular shoulder which is formed to provide a grooved seat 25 having mounted thereon a rubber gasket 26. An annular rib or bead 27 on the outer end of the stem 1 is engageable with the gasket 26 for preventing leakage between the valve 20 and said stem 1.

In Figure 2 of the drawings, reference numeral 28 designates an end portion of an inflating or filling adapter 29 which is detachably secured to the stem 1 through the medium of a connector 30 after the valve 20 has been removed, said connector 30 being threaded on the flange 19. The adapter 29 includes an air escape tube 31 which is provided, on its outer end, with a control valve (not shown).

To inject water or other liquid into the inner tube 4, the connector 30 is screwed home on the stem 1, after the valve 20 has been removed, thus bringing the end portion 28 of the adapter 29 into engagement with the slidable tubular core 8 and projecting said core into said tube 4 to open position. It will be observed that when the tubular core 8 is in its inner or open position, the ports 10 communicate with the inner tube 4. The aforementioned control valve is removed from the outer end of the tube 31 and water under pressure from any suitable source is turned on in the adapter 29. This water, or other liquid, flows from the adapter 29 through the tubular core 8 and passes through the ports 10 into the inner tube 4. Air which would otherwise be trapped in the inner tube 4 escapes through the tube 31 which, when the adapter 29 is connected to the stem 1 is projected upwardly through the sealing disk 15 into the upper portion of the tire. Air may be injected as desired into the tire by mounting the valve on the outer end of the tube 31 and applying thereto the usual nozzle of an air hose. When the adapter 29 is disconnected from the stem 1 and the tube 31 is withdrawn, the flexible sealing disk 15 closes and the slidable tubular core 8 moves outwardly to close position in the stem 1. The valve 20 is then mounted on the stem 1 and engaged with the bead or rib 27. If desired, air may be injected into the tire by the application of an air hose to the valve 20. The stem 21 further includes an internal shoulder 32 which is engageable with the outer end of the tubular core 8. By tightening the stem 21 on the stem 1 the tubular core 8 may be opened sufficiently to permit the pressure in the tire to be ascertained by applying a gauge in the usual manner to the valve 20.

It is believed that the many advantages of a tractor tire valve constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

Having described the invention, what is claimed as new is:

1. A tire valve of the character described comprising a tubular stem adapted to be mounted on an inner tube for communicating therewith, a tubular core slidably mounted in the stem for projection into the inner tube, said core having radial ports in its inner end portion normally covered by the stem and adapted to be uncovered for communication with the tube when the core is in inwardly projected position, and an inflation valve threadedly mounted on the stem and engageable with the core for projecting said core inwardly into communication with the inner tube.

2. A tire inner tube valve of the character described comprising a tubular stem having means at its outer end for connecting the same with an adapter, a tubular core slidably mounted in the stem for projection into the inner tube, said core having ports in its inner end portion normally covered by the stem and adapted to be uncovered for communication with the inner tube when said core is in inwardly projected position, a flexible sealing disk on the inner end of the core having slits to permit the passage of an air escape tube on the adapter, the outer end of said core being engageable with the adapter and being movable into the inner tube by said connecting means, and means on the core engageable with the stem for limiting the inward movement of said core.

3. A tire valve of the character described comprising a tubular stem adapted to be mounted on an inner tube for communicating therewith and having means at its outer end for connecting the same to an adapter, a tubular core slidably mounted in the stem for projection into the inner tube, said core having radial ports in its inner end portion normally covered by the stem and adapted to be uncovered for communication with the inner tube when the core is in inwardly projected position, an inturned flange on the inner end portion of the core, a ring mounted on the flange, inwardly projecting fingers on the ring, a sealing disk mounted on the ring and fingers, the outer end of said slidable core being engageable with the adapter and movable to open position into the inner tube by said connecting means, the sealing disk having slits therein for the passage of an air escape tube on said adapter, and means for limiting the inward sliding movement of the core.

KARL V. BAKER.